(12) United States Patent
Yao

(10) Patent No.: US 11,521,350 B2
(45) Date of Patent: Dec. 6, 2022

(54) METHOD AND APPARATUS FOR PROCESSING IMAGE, ELECTRONIC DEVICE, AND STORAGE MEDIUM

(71) Applicant: Beijing Baidu Netcom Science and Technology Co., Ltd., Beijing (CN)

(72) Inventor: Meng Yao, Beijing (CN)

(73) Assignee: Apollo Intelligent Driving Technology (Beijing) Co., Ltd., Beijing (CN)

( * ) Notice: Subject to any disclaimer, the term of this patent is extended or adjusted under 35 U.S.C. 154(b) by 0 days.

(21) Appl. No.: 17/113,310

(22) Filed: Dec. 7, 2020

(65) Prior Publication Data

US 2021/0407184 A1 Dec. 30, 2021

(30) Foreign Application Priority Data

Jun. 30, 2020 (CN) .......................... 202010622385.0

(51) Int. Cl.
*G06T 17/00* (2006.01)
*G06V 10/75* (2022.01)

(52) U.S. Cl.
CPC ............ *G06T 17/00* (2013.01); *G06V 10/751* (2022.01)

(58) Field of Classification Search
None
See application file for complete search history.

(56) References Cited

U.S. PATENT DOCUMENTS

2017/0161590 A1* 6/2017 Boulkenafed .......... G06V 10/82
2019/0325089 A1 10/2019 Golparvar-Fard

FOREIGN PATENT DOCUMENTS

JP 2005063129 A 3/2005

OTHER PUBLICATIONS

Klein, G. & Murray, D., "Parallel Tracking and Mapping for Small AR Workspaces," Active Vision Laboratory, Oxford University, 2007 (10 pages).

* cited by examiner

*Primary Examiner* — Peter Hoang
(74) *Attorney, Agent, or Firm* — Nixon Peabody LLP

(57) ABSTRACT

Disclosed are a method and apparatus for processing an image, an electronic device and a storage medium. A specific implementation comprises: acquiring a matching association relationship of a feature point in each to-be-modeled image frame in a to-be-modeled image frame set, a plurality of to-be-modeled image frames in the to-be-modeled image frame set belonging to at least two different to-be-modeled image sequences; determining a first feature point set of the each to-be-modeled image frame based on the matching association relationship, the first feature point set including a first feature point, and the first feature point matching a corresponding feature point in a to-be-modeled image frame in a different to-be-modeled image sequence; and selecting, based on a number of the first feature point in the first feature point set in the each to-be-modeled image frame, a to-be-modeled image frame from the to-be-modeled image frame set for a three-dimensional reconstruction.

17 Claims, 8 Drawing Sheets

METHOD AND APPARATUS FOR PROCESSING IMAGE, ELECTRONIC DEVICE, AND STORAGE MEDIUM

CROSS-REFERENCE TO RELATED APPLICATIONS

This application claims priority to Chinese Patent Application No. 202010622385.0, filed with the China National Intellectual Property Administration (CNIPA) on Jun. 30, 2020, the contents of which are incorporated herein by reference in their entirety.

TECHNICAL FIELD

The present disclosure relates to the field of image processing, and specifically to the computer vision technology.

BACKGROUND

With the development of technology, digital products such as various digital cameras and video cameras, and mobile phones have become necessities in life, and imaging data may be conveniently acquired. Imaging is not only a popular entertainment medium, but also a real reproduction of a historical feature, an environmental change, and a scene description. Therefore, it can be said that the image is an effective carrier of expressing the real world. With the development of technologies such as intelligent manufacturing, artificial intelligence and auxiliary driving, there is an urgent need to fully mine the three-dimensional geometric information contained in the image, so as to realistically restore the real world using the image. In a large number of imaging data, video is an important information source, and has not only the features of a general image, but also a time attribute. Therefore, there is a great market demand for the technology of effectively extracting three-dimensional information of an object from video data to perform a three-dimensional reconstruction.

SUMMARY

Embodiments of the present disclosure provide a method and apparatus for processing an image, a device and a storage medium, to solve the problem that a three-dimensional reconstruction cannot be implemented due to a low degree of association caused by cross-time and cross-camera images.

According to a first aspect of the present disclosure, a method for processing an image is provided. The method includes: acquiring a matching association relationship of a feature point in each to-be-modeled image frame in a to-be-modeled image frame set, a plurality of to-be-modeled image frames in the to-be-modeled image frame set belonging to at least two different to-be-modeled image sequences; determining a first feature point set of the each to-be-modeled image frame based on the matching association relationship, the first feature point set including a first feature point, and the first feature point matching a corresponding feature point in a to-be-modeled image frame in a different to-be-modeled image sequence; and selecting, based on a number of the first feature point in the first feature point set in the each to-be-modeled image frame, a to-be-modeled image frame from the to-be-modeled image frame set for a three-dimensional reconstruction.

According to a second aspect of the present disclosure, an apparatus for processing an image is provided. The apparatus includes: a matching association relationship acquisition module, configured to acquire a matching association relationship of a feature point in each to-be-modeled image frame in a to-be-modeled image frame set, a plurality of to-be-modeled image frames in the to-be-modeled image frame set belonging to at least two different to-be-modeled image sequences; a first feature point set determination module, configured to determine a first feature point set of the each to-be-modeled image frame based on the matching association relationship, the first feature point set including a first feature point, and the first feature point matching a corresponding feature point in a to-be-modeled image frame in a different to-be-modeled image sequence; and a reconstruction module, configured to select, based on a number of the first feature point in the first feature point set in the each to-be-modeled image frame, a to-be-modeled image frame from the to-be-modeled image frame set for a three-dimensional reconstruction.

According to a third aspect of the present disclosure, an electronic device is provided. The electronic device includes: at least one processor; and a storage device, communicated with the at least one processor, where the storage device stores an instruction executable by the at least one processor, and the instruction is executed by the at least one processor, to enable the at least one processor to perform the method according to the first aspect.

According to a fourth aspect of the present disclosure, a non-transitory computer readable storage medium is provided, the non-transitory computer readable storage medium, storing a computer instruction thereon, where the computer instruction is used to cause a computer to perform the method according to the first aspect.

It should be understood that the content described in this section is not intended to identify key or important features of the embodiments of the present disclosure, and is not used to limit the scope of the present disclosure. Other features of the present disclosure will be easily understood through the following description.

BRIEF DESCRIPTION OF THE DRAWINGS

The above and other objectives, features and advantages of the present disclosure will become more apparent in combination with the accompanying drawings and with reference to the following detailed description. In the accompanying drawings, the same or similar reference numerals denote the same or similar elements. In the accompanying drawings.

DETAILED DESCRIPTION OF EMBODIMENTS

Figure 1:
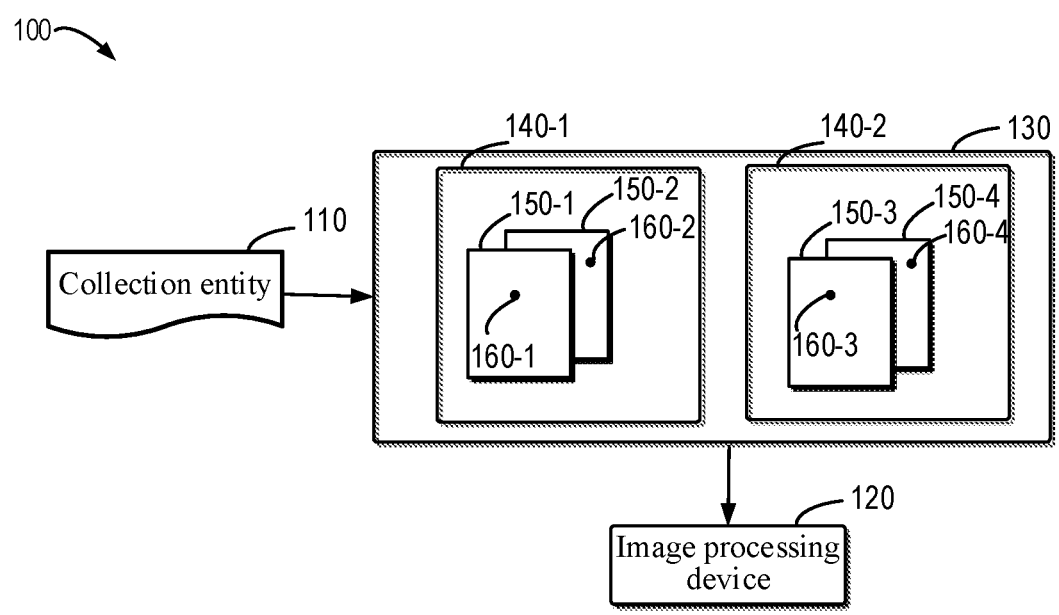
FIG. 1 is a schematic diagram of an example environment in which various embodiments of the present disclosure can be implemented.

Exemplary embodiments of the present disclosure are explained below in combination with the accompanying drawings, and various details of the embodiments of the present disclosure are included in the explanation to facilitate understanding, and should be regarded as merely exemplary. Therefore, it should be recognized by those of ordinary skill in the art that various changes and modifications may be made to the embodiments described herein without departing from the scope and spirit of the present disclosure. Likewise, for clarity and conciseness, descriptions for well-known functions and structures are omitted in the following description.

In the description of embodiments of the present disclosure, the term "comprising" and similar terms should be understood as open-ended, i.e., "including, but not limited to." The term "based on" should be understood as "at least partially based on." The term "an embodiment" or "this embodiment" should be understood as "at least one embodiment." The terms "first," "second," etc. may refer to different or identical objects. Other explicit and implicit definitions may also be included below.

As used herein, the term "collection entity" may be, but not limited to, a driving system. The driving system may include an autonomous driving system and/or a non-autonomous driving system. Hereinafter, embodiments of the present disclosure are discussed with a collection vehicle as an example. However, it should be understood that the solution of the present disclosure may similarly be applied to other types of collection entities.

As mentioned above, using a video image to realistically restore the real world (i.e., three-dimensional reconstruction) is important for the development of technologies such as the intelligent manufacturing technology, the artificial intelligence technology and the auxiliary driving technology. A three-dimensional reconstruction based on a video sequence may effectively restore a three-dimensional model of an object, such that it is convenient to further acquire related information about the object. An existing three-dimensional reconstruction is generally realized through the SFM (structure from motion) technology. Generally, the reconstruction process is as follows: first, a plurality of two-dimensional images corresponding to a to-be-reconstructed scene are acquired; then, an operation such as a feature extraction and feature matching are performed on all the two-dimensional images to determine matching relationships between two-dimensional image points in the two-dimensional images and three-dimensional image points; finally, a three-dimensional image of the scene is established according to the matching relationships. For example, in the auxiliary driving, a pixel point having a significant feature change, i.e. a feature point (e.g., a road sign on a road or a tree), in a scene that a vehicle passes through during the travelling of the vehicle, may be reconstructed by using images captured during the travelling of the vehicle, and thus, the relative relationship between the vehicle and these feature points is backward deduced, to perform the auxiliary driving.

Video data is characterized by a high degree of overlap between adjacent images, which may provide abundant information for a reconstruction, but at the same time, causes a problem of low reconstruction efficiency. Conventional reconstruction methods mostly incorporate the entire video data into the reconstruction process, which not only affects the reconstruction efficiency, but also reduces the precision of the reconstruction. In addition, when a heterogeneous camera is used or the same camera is used to collect a to-be-reconstructed scene at different times, since the number of feature points having matching relationships in image frames in the same image sequence is large due to an unstable factor such as illumination, time, season, a motion object, and a camera parameter, and the number of feature points having matching relationships between image frames in different image sequences is small, different image sequences cannot be fused together during the three-dimensional modeling.

According to embodiments of the present disclosure, an image processing scheme is proposed. According to the scheme, when the to-be-modeled image frames are from different image sequences, for each to-be-modeled image frame in the to-be-modeled image frame set, based on the matching association relationships of feature points in the to-be-modeled image frame, the feature points are divided into two types: a feature point (hereinafter, referred to as a "first feature point") matching a corresponding feature point in a to-be-modeled image frame in a different to-be-modeled image sequence, and a feature point (hereinafter, referred to as a "second feature point") only matching a corresponding feature point in a to-be-modeled image frame in the same to-be-modeled image sequence. Then, according to the number of the "first feature point," a to-be-modeled image frame is selected from the to-be-modeled image frame set for the three-dimensional reconstruction. The three-dimensional reconstruction method based on the matching association relationship is used, and thus, a portion of the "second feature points" matching in the same sequence is filtered out during the three-dimensional reconstruction, and the "first feature points" matching across sequences are preferentially used, which makes the number of the "first feature points" and the number of the "second feature points" balanced. In this way, the reconstruction efficiency is effectively improved and the failure of the three-dimensional reconstruction using cross-sequence image frames is avoided, thus improving the probability of the successful reconstruction.

Embodiments of the present disclosure will be described in detail below with reference to the accompanying drawings.

FIG. 1 is a schematic diagram of an example environment 100 in which various embodiments of the present disclosure can be implemented. In the example environment 100, an image processing device 120 performs the three-dimensional reconstruction of a scene by suing video image data 130 collected by a collection entity 130.

In embodiments of the present disclosure, the collection entity 110 used for acquiring the video image data 130 may be any entity having a capability of collecting video image data, such as a mobile device and a conveyance. The collection entity 110 may also be various entities integrated with or carrying a device having a capability of collecting video image data. It should be appreciated that the collection entity 110 may transmit the video image data 130 to the image processing device 120 in any form of data transmission such as a wired or wireless data transmission. Such transmission does not have to be a real-time transmission.

The subsequent processing performed on the video image data 130 by the image processing device 120 is not affected by whenever or in whatever the video image data 130 is transmitted to the image processing device 120.

The image processing device 120 may perform the three-dimensional reconstruction based on the acquired video image data 130, and the image processing device 120 may be provided on the collection entity 110, or may be provided outside the collection entity 110 and perform a signal interaction with the collection entity 110 by means of wireless communication.

The video image data 130 may be preprocessed according to the related information about the collected video image data 130, such that the collected video image data 130 includes different image sequences 140-1 and 140-2 (hereinafter, collectively referred to as image sequences 140). The different image sequences may be video images captured by different cameras for a same scene, or video images captured by a same camera the same scene but at different times. Each image sequence includes a plurality of image frames 150-1, 150-2, 150-3 and 150-4 (hereinafter, collectively referred to as image frames 150). For each image frame 150, a feature point extraction may be performed using an existing feature point extraction method, to extract feature points 160-1, 160-2, 160-3 and 160-4 (hereinafter, collectively referred to as feature points 160). The purpose of the feature point extraction is to match the feature points, to obtain useful information such as an interrelation between the feature points of different image frames, for performing the three-dimensional reconstruction. Existing feature point extraction method and a feature point matching method may be used to perform the feature point extraction and matching on the image frames in same sequence and the image frames in different sequences. For example, a Harris feature point extraction method, a scale invariant feature transform (SIFT) feature point extraction method, and the like may be used. Various embodiments herein are described on the basis that the feature point extraction and matching are completed.

During the three-dimensional reconstruction, each to-be-modeled image frame is added to a model frame by frame. Since there are a plurality of different image sequences, there may be two association relationships between feature points, i.e., a cross-sequence matching association relationship and an intra-sequence matching association relationship. A feature point having the cross-sequence matching association relationship indicate that it repeatedly appears in image frames of different sequences. Therefore, this feature point is reliable and has a high confidence level compared with a feature point having the intra-sequence matching association relationship, and its corresponding image frame and the feature point having the cross-sequence matching association relationship should be preferentially added to the model for the three-dimensional reconstruction.

The number of the image sequences, the number of the image frames, and the number of the feature points in the image frame shown in FIG. 1 are merely exemplary and are not intended to be limiting. It should be appreciated that there may be any suitable numbers of image sequences, image frames and feature points.

Figure 2:
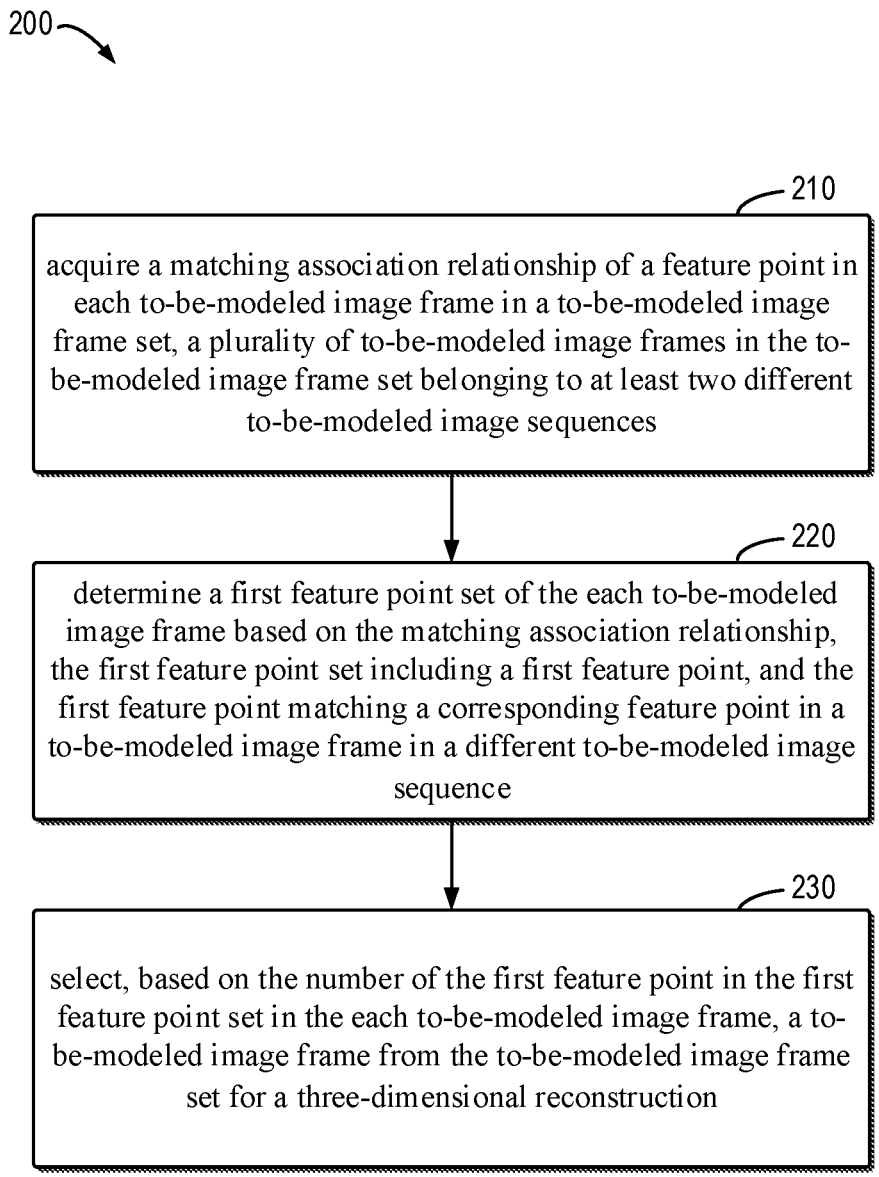
FIG. 2 is a flowchart of a method for processing an image according to some embodiments of the present disclosure.

FIG. 2 is a flowchart of a method 200 for processing an image according to some embodiments of the present disclosure. For ease of discussion, the method 200 is described in combination with FIG. 1. The method 200 may be implemented by an image processing device 120.

Figure 3:
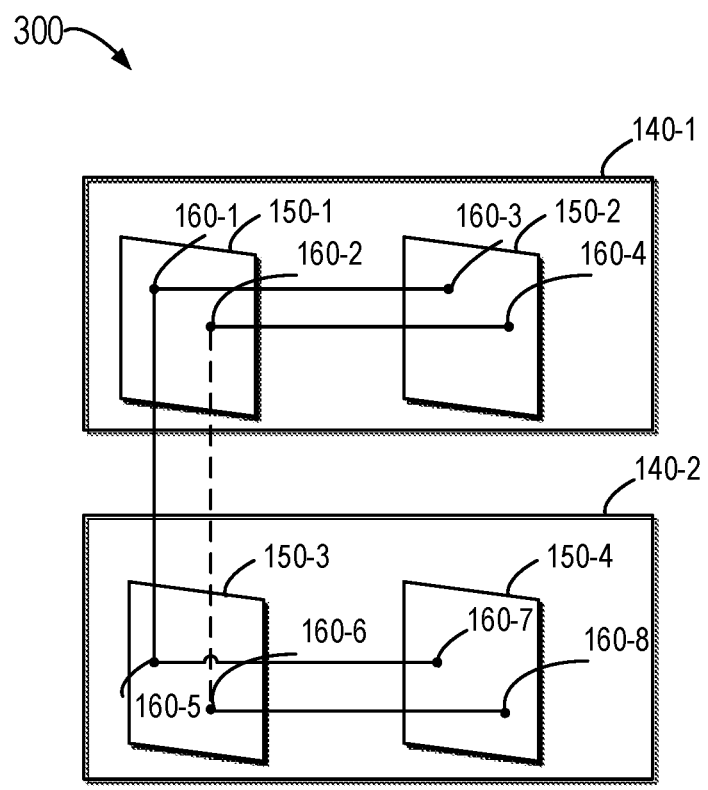
FIG. 3 is a schematic diagram of a matching association relationship of a feature point according to some embodiments of the present disclosure.

At block 210, the image processing device 120 may acquire a matching association relationship of a feature point 160 in each to-be-modeled image frame 150 in a to-be-modeled image frame set, a plurality of to-be-modeled image frames in the to-be-modeled image frame set belonging to at least two different to-be-modeled image sequences 140. The matching association relationship indicates that the feature point 160 matches a corresponding feature point 160 in another to-be-modeled image frame 150 in the to-be-modeled image frame set. In some embodiments, the to-be-modeled image frame set may be considered as a to-be-modeled image frame queue, including a plurality of to-be-modeled image frames. All the to-be-modeled image frames in the to-be-modeled image frame queue need to be added to the model during three-dimensional modeling. In some embodiments, the matching association relationship of a feature point may be acquired by performing the feature point extraction and matching on a to-be-modeled image frame. FIG. 3 is a schematic diagram of a matching association relationship 300 of a feature point according to some embodiments of the present disclosure. For clarity, the content of the method 200 will be described in detail below in combination with FIG. 3.

In FIG. 3, the sequence A 140-1 includes two image frames A-1 150-1 and A-2 150-2, and the sequence B 140-2 includes two image frames B-1 150-3 and B-2 150-4. Here, two feature points p1 160-1 and q1 160-2 are detected in the image frame A-1 150-1, two feature points p2 160-3 and q2 160-4 are detected in the image frame A-2 150-2, two feature points p1' 160-5 and m1' 160-6 are detected in the image frame B-1 150-3, and two feature points p2' 160-7 and m2' 160-8 are detected in the image frame B-2 150-4. These image frames are collected for the same scene at different times, and the matching association relationship of the feature points may be obtained by matching the feature points. For example, the feature point p1 160-1 in the image frame A-1 150-1 matches the feature point p2 160-3 in the image frame A-2 150-2, the feature point p1' 160-5 in the image frame B-1 150-3, and the feature point p2' 160-7 in the image frame B-2 150-4, that is, they represent the same feature point. Thus, the matching association relationship of the point p may be acquired as {p2→p1→p1'→p2'}. Moreover, it may be obtained that the feature point q1 160-2 in the image frame A-1 150-1 matches the feature point q2 160-4 in the image frame A-2 150-2, but does not match the feature point m1' 160-6 in the image frame B-1 150-3. Thus, the matching association relationship of the point q may be acquired as {q1→q2}. Moreover, the feature point m1' 160-6 in the image frame B-1 150-3 matches the feature point m2' 160-8 in the image frame B-2 150-4. Thus, the matching association relationship of the point m may be acquired as {m1'→m2'}. It can be seen that according to the matching association relationships of the feature points, the feature points may be divided into two types: a feature point having a cross-sequence matching relationship and a feature point only having an intra-sequence matching relationship.

For clarity, only two image sequences are shown in FIG. 3, and thus, there are feature points having matching relationships only across the two sequences. However, it should be understood that in practice, there may be a plurality of image sequences, and therefore, there may be a feature point having a matching relationship across the plurality of image sequences. The greater the number of image sequences that the matching relationship thereof is across is, which indicates that the feature point appears repeatedly in a plurality of image sequences, the more stable the feature point is. In addition, for clarity, FIG. 3 shows the matching association relationship as a chain relationship, but it should be understood that in practice, one point can often match a plurality of points, accordingly the final matching association relationship may be a complex net-like relationship, which is in a form of graph. For example, when there is a matching association relationship between the feature point p in the image frame A-2 and the feature point p in the image frame B-2, the matching association relationship of the point p is net-like.

In some embodiments, the matching association relationship may be in the form of a graph that saves not only a corresponding relationship between each two feature points, but also multi-dimensional information such as its association strength (i.e., a matching similarity). In some embodiments, according to the matching association relationship, modeling initialization may be performed using two to-be-modeled image frames that 1) come from two different to-be-modeled image sequences and 2) of which the number of the matching feature points is largest. In this way, a preliminary model can be established as soon as possible and reliably at an early stage, and then, each to-be-modeled image frame is added to the model frame by frame, thereby completing the three-dimensional reconstruction.

At block 220, the image processing device 120 may determine a feature point set (hereinafter, referred to as a "first feature point set") of the each to-be-modeled image frame 150 according to the matching association relationship, and a feature point 160 (hereinafter, referred to as a "first feature point") in the "first feature point set" matches a corresponding feature point 160 in a to-be-modeled image frame 150 in a different to-be-modeled image sequence 140. During the three-dimensional reconstruction, each feature point has information such as a spatial position coordinate and an image sequence to which the feature point belongs. Thus, in some embodiments, the first feature point 160 having the cross-sequence matching relationship in the each to-be-modeled image frame 150 may be determined according to the matching association relationship of the feature point and the related information of the feature point. For example, the matching association relationship of the point p in the frame A-1 is {p2→p1→p1'→p2'}. Since the matching association relationship of the point p relates to two image sequences 140-1 and 140-2, it may be determined that the point p is a first feature point having the cross-sequence matching relationship. In some embodiments, for the each to-be-modeled image frame 150, all first feature points therein having the cross-sequence matching relationship may be determined to constitute the "first feature point set."

In some embodiments, the image processing device 120 may further classify the first feature points having cross-sequence matching relationships according to the matching association relationship. In some embodiments, the image processing device 120 may further classify the first feature points according to the number of sequences that their matching association relationships are across. For example, the first feature points are further divided into feature points having an association relationship across two sequences, feature points having an association relationship across three sequences, and so on, so as to respectively determine feature point sets having association relationships across different numbers of sequences. The greater the number of the sequences that the matching association relationship thereof is across is, the more reliable the feature point are, and the higher the confidence level is. Their corresponding image frames and their feature points having the cross-sequence matching relationships should be preferentially added to the model for the three-dimensional reconstruction.

In some embodiments, the image processing device 120 may determine a feature point set (hereinafter, referred to as a "second feature point set") of the each to-be-modeled image frame 150 based on the matching association relationship, where a feature point 160 (hereinafter, referred to as a "second feature point") in the "second feature point set" only matches a corresponding feature point 160 in a to-be-modeled image frame 150 in the same to-be-modeled image sequence 140. In some embodiments, the second feature point 160 only having the intra-sequence matching relationship in the each to-be-modeled image frame 150 may be determined based on the matching association relationship of the feature point 160 and the related information about the feature point 160. For example, the matching association relationship of the point q in the frame A-1 is {q1→q2}. Since the matching association relationship of the point q only relates to one image sequence 140-1, it may be determined that the point q is a second feature point only having the intra-sequence matching relationship. In some embodiments, for each to-be-modeled image frame 150, all second feature points therein only having the intra-sequence matching relationship may be determined to constitute the second feature point set.

At block 230, based on the number of the first feature points 160 in the "first feature point set" in the each to-be-modeled image frame 150, the image processing device 120 may select a to-be-modeled image frame from the to-be-modeled image frame set to perform the three-dimensional reconstruction. The three-dimensional reconstruction is completed by adding each to-be-modeled image frame to an existing model frame by frame. Therefore, the order of adding the image frames and the used feature points have a great influence on the reconstruction efficiency and success rate of the three-dimensional reconstruction. Since the feature point having the cross-sequence matching relationship is more reliable, an image frame, which has more feature points having cross-sequence matching relationships, is preferentially used during the adding the image frames. In some embodiments, the image processing device 120 may determine the number of the first feature points in the "first feature point set" in the each to-be-modeled image frame. In some embodiments, a to-be-modeled image frame may be selected based on the number of the first feature points in the "first feature point set" in the each to-be-modeled image frame, to be preferentially used for the three-dimensional reconstruction. In some embodiments, for the selected to-be-modeled image frame, the image processing device 120 may preferentially use all of the first feature points having the cross-sequence matching relationship. In some embodiments, for the selected to-be-modeled image frame, the image processing device 120 may discard a portion of the second feature points only having the intra-sequence matching relationship.

The feature points are divided into the feature point having the cross-sequence matching association relationship and the feature point only having the intra-sequence matching association relationship based on the matching association relationship of the feature points. Accordingly, a portion of the "second feature points" matching in the same sequence is filtered out during the three-dimensional reconstruction, and the "first feature points" matching across sequences are preferentially used, which makes the number of the "first feature points" and the number of the "second feature points" balanced. Thus, it ensures that the cross-sequence images can be fused correctly, effectively improves the reconstruction efficiency, and avoids the failure of the three-dimensional reconstruction using cross-sequence image frames, thus improving the probability of the successful reconstruction.

For ease of discussion, an implementation of block 230 will be described in detail below in combination with FIGS. 4-6, that is, how to select, based on the number of the "first feature points", the to-be-modeled image frame from a to-be-modeled image frame set, to perform the three-dimensional reconstruction. Furthermore, for the purpose of illustration only, the to-be-modeled image frame 150-1 is described. It may be understood that the description for the to-be-modeled image frame 150-1 may be applied to any to-be-modeled image frame in the to-be-modeled image frame set.

In some embodiments, the image processing device 120 may determine that the number of the first feature points 160 of the to-be-modeled image frame 150-1 is greater than a threshold (hereinafter, referred to as a "first threshold"), and select the to-be-modeled image frame 150-1 for performing the three-dimensional reconstruction. Here, all the "first feature points" in the "first feature point set" of the to-be-modeled image frame 150-1 are used for performing the three-dimensional reconstruction. The image processing device 120 may remove the to-be-modeled image frame from the to-be-modeled image frame set, in response to the three-dimensional reconstruction performed using the to-be-modeled image frame being successful. After the preliminary model is generated by performing the three-dimensional modeling initialization, the to-be-modeled image frame 150-1 is taken out from the to-be-modeled image frame queue sequentially. In some embodiments, the number of the "first feature points" of the to-be-modeled image frame 150-1 may be compared with a threshold (hereinafter, referred to as the "first threshold"). In response to the number being greater than the first threshold, the to-be-modeled image frame 150-1 is selected, and the three-dimensional reconstruction is performed using all the "first feature points" in the "first feature point set" of the selected to-be-modeled image frame 150-1. It may be appreciated that the value of the "first threshold" is related to the three-dimensional reconstruction algorithm used subsequently, and may be selected according to the empirical value in the actual operation.

In some embodiments, the image processing device 120 may respectively determine the numbers of sets of feature points having association relationships across different numbers of sequences, and select an image frame for participating in the three-dimensional reconstruction and the feature points of the image frame based on the numbers. In some embodiments, the image processing device 120 may preferentially select a video frame having a feature point having a matching association relationship across a plurality of sequences and the feature point having the matching association relationship across the plurality of sequences to perform the three-dimensional reconstruction.

Since the feature points of an image frame are not distributed uniformly, there may be a situation that when the number of the first feature points is greater than the "first threshold," but the modeling is not successful. In some embodiments, the image processing device 120 may determine whether the three-dimensional reconstruction using the to-be-modeled image frame 150-1 is successful, and remove the to-be-modeled image frame 150-1 from the to-be-modeled image frame set, in response to the three-dimensional reconstruction using the to-be-modeled image frame being successful. At this time, the modeling by the to-be-modeled image frame 150-1 ends. In some embodiments, in response to the three-dimensional reconstruction using the to-be-modeled image frame being failed, the to-be-modeled image frame 150-1 may be retained in the to-be-modeled image frame set, to continue being used for the three-dimensional modeling in the subsequent process. In some embodiments, for the to-be-modeled image frame 150-1, the feature point used thereby, and the existing model, the pose of a feature point of the to-be-modeled image frame 150-1 in the existing model may be calculated. If the pose can be calculated and obtained, the to-be-modeled image frame 150-1 is considered as being successfully added to the model.

In this way, it is ensured that the feature points having the cross-sequence matching association relationships are used for the three-dimensional modeling as much as possible, which improves the reconstruction efficiency, and avoids the failure of the three-dimensional reconstruction using the cross-sequence image frame, thus improving the probability of the successful reconstruction.

Figure 4:
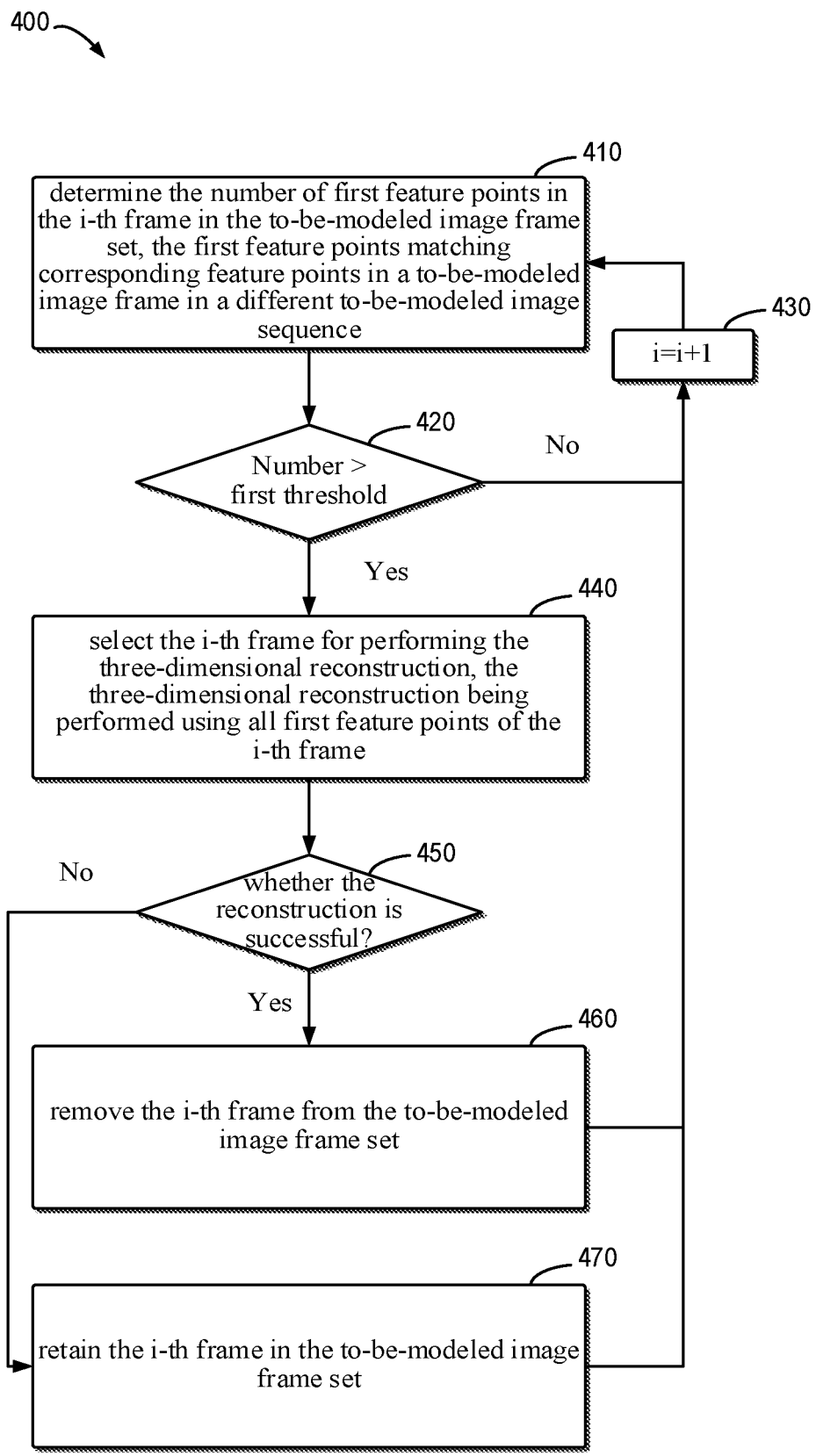
FIG. 4 is a flowchart of a method for selecting a to-be-modeled image frame for a three-dimensional reconstruction according to some embodiments of the present disclosure.

FIG. 4 is a flowchart of a method 400 for selecting a to-be-modeled image frame for performing a three-dimensional reconstruction according to some embodiments of the present disclosure. For ease of discussion, the method 400 is described in combination with FIG. 1. In such an example, the method 400 may be implemented by an image processing device 120. In some embodiments, the method 400 may be regarded as a specific implementation of block 230 of the process 200.

At block 410, the i-th frame is taken out from a to-be-modeled image frame queue (i.e., set). The image processing device 120 may determine the number of first feature points in the i-th frame in the to-be-modeled image frame set, the first feature points matching corresponding feature points in a to-be-modeled image frame in a different to-be-modeled image sequence. At block 420, the image processing device 120 may determine whether the number is greater than a "first threshold." If the determination result of block 420 is "No", then i is incremented by 1 at block 430, such that the above i-th frame is temporarily not used for the three-dimensional reconstruction, and the (i+1)-th frame is taken out from the to-be-modeled image frame queue to perform the following operations. If the determination result of block 420 is "Yes," at block 440, the i-th frame is selected to perform the three-dimensional reconstruction. Here, all the "first feature points" of the i-th frame are used to perform the three-dimensional reconstruction. At block 450, whether the three-dimensional reconstruction using the i-th frame is successful is determined. If the determination result is "Yes," at block 460, the i-th frame is removed from the to-be-modeled image frame set. Otherwise, at block 470, the i-th frame is retained in the to-be-modeled image frame set. After the processing for the i-th frame at block 460 or block 470, i is incremented by 1 at block 430. Then, the (i+1)-th frame is taken out from the to-be-modeled image frame queue, and the same operations described above with reference to blocks 410-470 are performed.

After the above operations for the i-th frame are completed, a next to-be-modeled image frame is sequentially taken out from the to-be-modeled image frame queue to perform the same operations, until all image frames, that satisfy that the numbers of the first feature points therein are greater than the "first threshold value", in the to-be-modeled image frame are used for the three-dimensional reconstruction.

In this way, during the three-dimensional reconstruction, a to-be-modeled image frame having a plurality of feature points having cross-sequence matching association relationships can be preferentially used, all the feature points having the cross-sequence matching association relationships in the to-be-modeled image frame are only used, and a feature point having an intra-sequence matching association relationship in the to-be-modeled image frame is discarded. Accordingly, the number of the "first feature points" and the number of the "second feature points" are balanced, which ensures that the cross-sequence images can be fused correctly, and effectively improves the reconstruction efficiency and the probability of the successful reconstruction.

In some embodiments, the image processing device 120 may determine that, in the current to-be-modeled image frame set, the number of the first feature points 160 of the to-be-modeled image frame 150-1 is greater than another threshold (hereinafter, referred to as a "second threshold") and that an image frame adjacent to the to-be-modeled image frame 150-1 is already used for the three-dimensional reconstruction. Here, the "second threshold" is less than the "first threshold." The image processing device 120 may select the to-be-modeled image frame 150-1 to perform the three-dimensional reconstruction. Here, all the "first feature points" in the "first feature point set" and a portion of the "second feature points" in the second feature point set are used to perform the three-dimensional reconstruction. The image processing device 120 may remove the to-be-modeled image frame 150-1 from the to-be-modeled image frame set in response to the three-dimensional reconstruction being successful.

In some embodiments, for each to-be-modeled image frame 150 in the current to-be-modeled image frame set, the image processing device 120 may also compare the number of the first feature points of the to-be-modeled image frame 150 with the "second threshold." Here, the "second threshold" is less than the "first threshold." In response to the number being greater than the "second threshold" and a frame adjacent to the to-be-modeled image frame 150 being already used for the three-dimensional reconstruction, all the "first feature points" in the "first feature point set" and a portion of the "second feature points" in the second feature point set of the to-be-modeled image frame 150 are then used for the three-dimensional reconstruction.

In this way, when only using the number of the feature points (i.e., the "first feature points") having the cross-sequence matching relationships in the to-be-modeled image frame is not enough to successfully implementing the modeling, a portion of the feature points (i.e., the "second feature points") having the intra-sequence matching relationships may be selectively used while all the "first feature points" are used, which further makes the number of the "first feature points" and the number of the "second feature points" balanced, thereby ensuring that the cross-sequence images can be fused correctly, and effectively improving the reconstruction efficiency and the probability of the successful reconstruction.

In some embodiments, the image processing device 120 may randomly select the portion of the "second feature points" in the second feature point set to perform the three-dimensional reconstruction. Here, the number R of the selected "second feature points" is less than the number of the "first feature points" in the "first feature point set." In this way, in the feature points used during the three-dimensional reconstruction, the feature points having cross-sequence matching relationships are more than the feature points having intra-sequence matching relationships, which makes the feature points having the cross-sequence matching relationships more advantageous in the three-dimensional reconstruction.

In addition, in the actual operation, when the three-dimensional reconstruction is performed using a feature point having the intra-sequence matching relationship, it is necessary to satisfy that an adjacent frame thereof is already in the model. In some embodiments, determining that an image frame adjacent to the to-be-modeled image frame is already used for the three-dimensional reconstruction may include:

determining that a difference in frame serial number between the to-be-modeled image frame and the image frame already used for the three-dimensional reconstruction is less than a threshold (hereinafter, referred to as a "third threshold"). For example, the value of the "third threshold" may be set to 3. When it is ascertained that the difference in frame serial number between the to-be-modeled image frame and the image frame already used for the three-dimensional reconstruction is less than 3, it may be considered that an image frame adjacent to the to-be-modeled image frame is already in the model. The "third threshold" may be set to a different value, and the larger the value is, the faster the model grows, but the speed of optimization would decrease. In some embodiments, the image processing device 120 may determine that an image frame adjacent to the to-be-modeled image frame is not used for the three-dimensional reconstruction, and thus, the to-be-modeled image frame is retained in the to-be-modeled image frame set.

It may be understood that, in the actual operation, the values of the "second threshold," the "third threshold", and the number R of the selected "second feature points" may be selected according to an empirical value.

Figure 5:
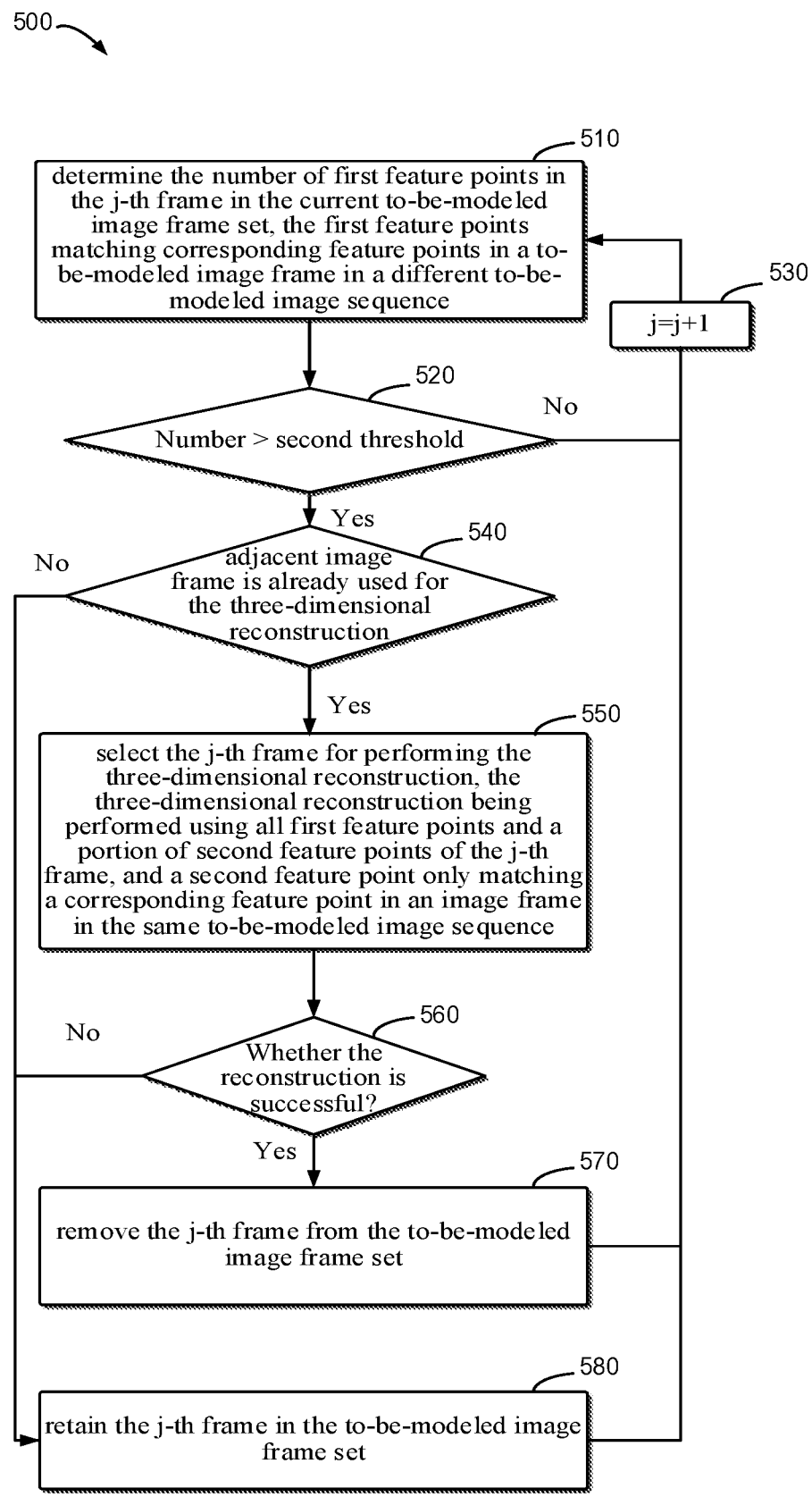
FIG. 5 is a flowchart of a method for selecting a to-be-modeled image frame for a three-dimensional reconstruction according to some embodiments of the present disclosure.

FIG. 5 is a flowchart of a method 500 for selecting a to-be-modeled image frame for performing a three-dimensional reconstruction according to some embodiments of the present disclosure. For ease of discussion, the method 500 is described in combination with FIG. 1. In such an example, the method 500 may be implemented by an image processing device 120. In some embodiments, the method 500 may be regarded as a specific implementation of block 230 of the process 200.

At block 510, the number of first feature points in the j-th frame in a current to-be-modeled image frame set is determined, and the feature points match corresponding feature points in a to-be-modeled image frame in a different to-be-modeled image sequence. At block 520, the image processing device 120 may determine whether the number is greater than a second threshold. If the determination result is "No," at block 530, j is incremented by 1, and the j-th frame is temporarily not used for the three-dimensional reconstruction, and the (j+1)-th frame is taken out from the to-be-modeled image frame queue to perform following operations. If the determination result of block 520 is "Yes," at block 540, whether an image frame adjacent to the to-be-modeled image frame is already used for the three-dimensional reconstruction is determined. If the determination result of block 540 is "Yes," at block 550, the j-th frame is selected to perform the three-dimensional reconstruction. Here, all the "first feature points" and a portion of the "second feature points" of the j-th frame are used to perform the three-dimensional reconstruction. The "second feature points" only match corresponding feature points in an image frame in the same to-be-modeled image sequence. If the determination result of block 540 is "No," at block 580, the j-th frame is retained in the to-be-modeled image frame set. At block 560, whether the three-dimensional reconstruction using the j-th frame is successful is determined. If the determination result of block 560 is "Yes," at block 570, the j-th frame is removed from the to-be-modeled image frame set. Otherwise, at block 580, the j-th frame is retained in the to-be-modeled image frame set, to continue being used for the three-dimensional modeling in the subsequent process.

After the j-th frame is processed at block 570 or block 580, j is incremented by 1 at block 530. Accordingly, the (j+1)-th frame is taken out from the to-be-modeled image frame queue, and the same operations described above with reference to blocks 510-580 are performed.

After the above operations on the j-th frame are completed, a next to-be-modeled image frame is sequentially taken out from the to-be-modeled image frame queue to perform the same operations, until all image frames, that satisfy that the numbers of the first feature points therein are greater than the "second threshold value" and image frames adjacent thereto are already used for the three dimensional-construction, in the to-be-modeled image frame set are used for the three-dimensional reconstruction.

In this way, the "second threshold" less than the "first threshold" is used to broaden the condition, and image frames having a relatively large number of feature points having the cross-sequence matching relationships are selected. However, the three-dimensional reconstruction using only the feature points having the cross-sequence matching relationship in those selected image frames cannot be successful. Therefore, when the reconstruction is performed, a portion of the feature points having intra-sequence matching relationships is used at the same time. Compared with the reconstruction performed using all the feature points having the intra-sequence matching relationship, the numbers of the "first feature points" and the "second feature points" that are used for the three-dimensional reconstruction can be further balanced, thereby ensuring that the cross-sequence images can be fused correctly, and effectively improving the reconstruction efficiency and the probability of the successful reconstruction.

In some embodiments, the image processing device 120 may determine, in the remaining to-be-modeled image frames in the to-be-modeled image frame set, that an image frame adjacent to a to-be-modeled image frame is already used for the three-dimensional reconstruction, and select the to-be-modeled image frame to perform the three-dimensional reconstruction. Here, all the "first feature points" in the "first feature point set" and all the "second feature points" in the "second feature point set" of the to-be-modeled image frame are used to perform the three-dimensional reconstruction. The image processing device 120 may remove the to-be-modeled image frame from the to-be-modeled image frame set in response to the three-dimensional reconstruction being successful.

Figure 6:
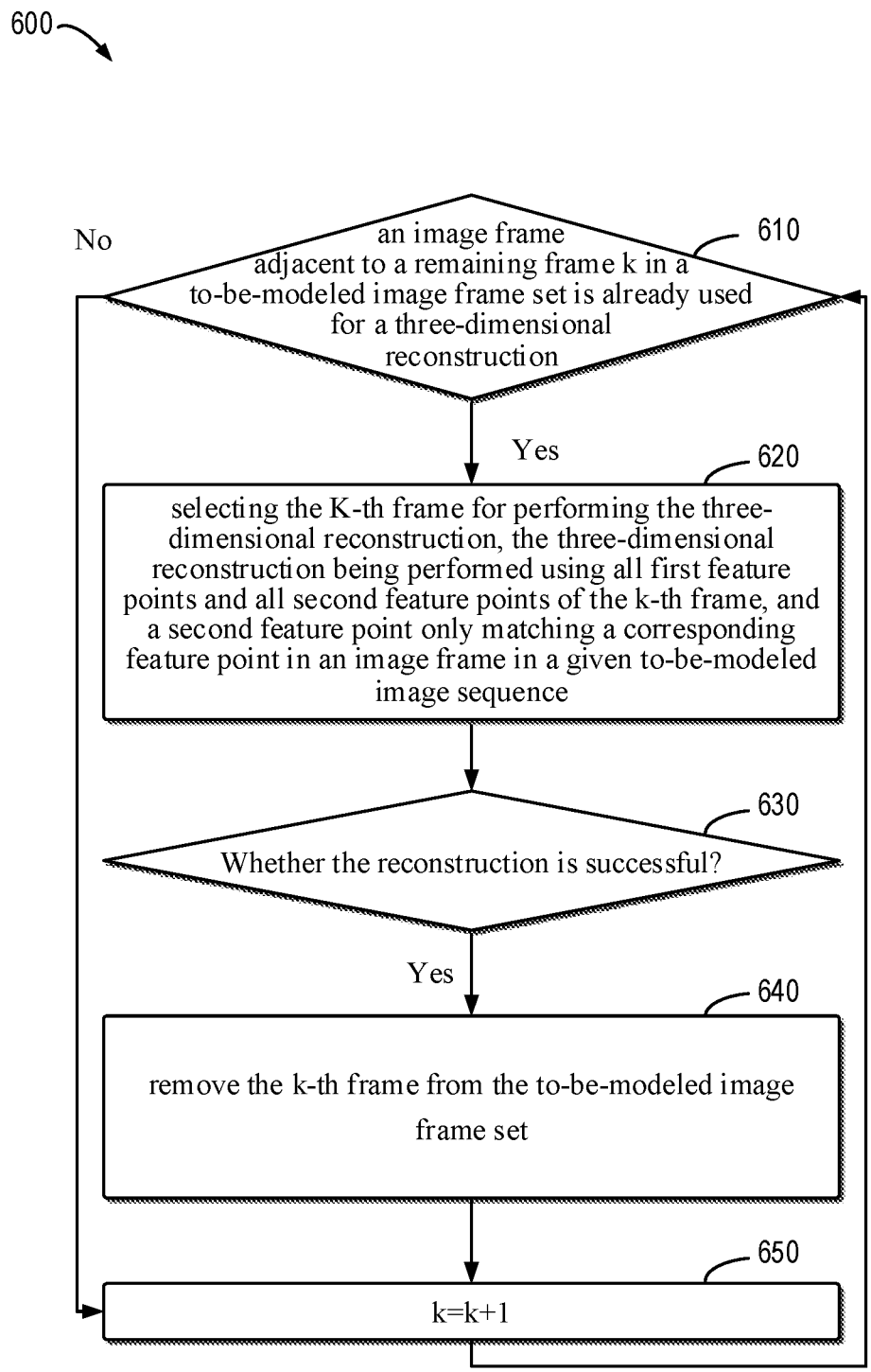
FIG. 6 is a flowchart of a method for selecting a to-be-modeled image frame for a three-dimensional reconstruction according to some embodiments of the present disclosure.

FIG. 6 is a flowchart of a method 600 for selecting a to-be-modeled image frame for a three-dimensional reconstruction according to some embodiments of the present disclosure. For ease of discussion, the method 600 is described in combination with FIG. 1. In such an example, the method 600 may be implemented by an image processing device 120. In some embodiments, the method 600 may be regarded as a specific implementation of block 230 of the process 200.

At block 610, whether an image frame adjacent to a remaining frame k in a to-be-modeled image frame set is already used for a three-dimensional reconstruction. If the determination result is "No," at block 650, k is incremented by 1, such that the k-th frame is temporarily not used for the three-dimensional reconstruction, and the (k+1)-th frame is taken out from the to-be-modeled image frame queue to perform following operations. If the determination result of block 610 is "Yes," at block 620, the k-th frame is selected to perform the three-dimensional reconstruction. Here, all the "first feature points" and all the "second feature points" of the k-th frame are used to perform the three-dimensional reconstruction. The "second feature points" only match corresponding feature points in an image frame in the same to-be-modeled image sequence. At block 630, whether the three-dimensional reconstruction using the k-th frame is successful is determined. If the determination result of is "Yes," at block 640, the k-th frame is removed from the to-be-modeled image frame set. Then, at block 650, k is incremented by 1, and thus, the (k+1)-th frame is taken out from the to-be-modeled image frame queue to perform the same operations described above with reference to blocks 610-650. At this time, if the to-be-modeled image frame cannot be reconstructed successfully, the frame may be discarded.

After the above operations for the k-th frame are completed, a next to-be-modeled image frame is sequentially taken out from the to-be-modeled image frame queue to perform the same operations until all image frames capable of participating in the modeling in the to-be-modeled image frame set are added to the model, and thus the modeling ends.

In this way, a continuously broadened selection condition is used, and to-be-modeled image frames satisfying different conditions are selected from the to-be-modeled image frame set in a certain order. For different to-be-modeled image frames, the used feature point is selected according to the numbers of the feature points having cross-sequence matching relationships in the to-be-modeled image frame, such that the ratio of the feature points having cross-sequence matching relationships to the feature points only having the intra-sequence matching relationship during the three-dimensional reconstruction may be reconciled, and thus, the success rate of the fusion of cross-sequence data is improved, and the problem of the three-dimensional reconstruction that is caused by a cross-time heterogeneous camera is solved.

Figure 7:
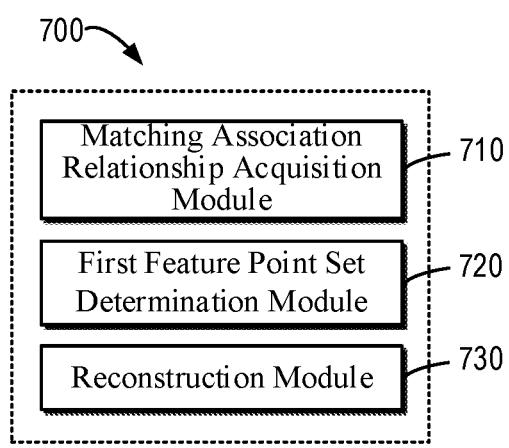
FIG. 7 is a schematic block diagram of an apparatus for processing an image according to an embodiment of the present disclosure.

FIG. 7 is a schematic block diagram of an apparatus 700 for processing an image according to an embodiment of the present disclosure. As shown in FIG. 7, the apparatus 700 includes: a matching association relationship acquisition module 710, configured to acquire a matching association relationship of a feature point in each to-be-modeled image frame in a to-be-modeled image frame set, a plurality of to-be-modeled image frames in the to-be-modeled image frame set belonging to at least two different to-be-modeled image sequences; a first feature point set determination module 720, configured to determine a first feature point set of the each to-be-modeled image frame based on the matching association relationship, the first feature point set including a first feature point, and the first feature point matching a corresponding feature point in a to-be-modeled image frame in a different to-be-modeled image sequence; and a reconstruction module 730, configured to select, based on a number of the first feature point in the first feature point set in the each to-be-modeled image frame, a to-be-modeled image frame from the to-be-modeled image frame set for a three-dimensional reconstruction.

In some embodiments, the apparatus 700 further includes: a second feature point set determination module, configured to determine a second feature point set of the each to-be-modeled image frame based on the matching association relationship, the second feature point set including a second feature point, and the second feature point only matching a corresponding feature point in a to-be-modeled image frame in a same to-be-modeled image sequence.

In some embodiments, the reconstruction module includes: a first threshold determination unit, configured to determine that a number of a first feature point in a to-bemodeled image frame is greater than a first threshold; a first reconstruction unit, configured to select the to-be-modeled image frame to perform the three-dimensional reconstruction, the three-dimensional reconstruction being performed using all first feature points in the first feature point set of the to-be-modeled image frame; and a first updating unit, configured to remove the to-be-modeled image frame from the to-be-modeled image frame set, in response to the three-dimensional reconstruction performed using the to-be-modeled image frame being successful.

In some embodiments, the reconstruction module further includes: a second threshold determination unit, configured to determine that a number of a first feature point in a to-be-modeled image frame is greater than a second threshold and that an image frame adjacent to the to-be-modeled image frame is already used for the three-dimensional reconstruction, the second threshold being less than the first threshold; a second reconstruction unit, configured to select the to-be-modeled image frame to perform the three-dimensional reconstruction, the three-dimensional reconstruction being performed using all first feature points in the first feature point set and a portion of second feature points in the second feature point set; and a second updating unit, configured to remove the to-be-modeled image frame from the to-be-modeled image frame set in response to the three-dimensional reconstruction being successful.

In some embodiments, the reconstruction module further includes: a feature point selection unit, configured to select randomly the portion of the second feature points from the second feature point set to perform the three-dimensional reconstruction, a number of the selected second feature points being less than the number of the first feature point in the first feature point set.

In some embodiments, the reconstruction module further includes: a third determination unit, configured to determine, in remaining to-be-modeled image frames in the to-be-modeled image frame set, that an image frame adjacent a to-be-modeled image frame is already used for the three-dimensional reconstruction; a third reconstruction unit, configured to select the to-be-modeled image frame to perform the three-dimensional reconstruction, the three-dimensional reconstruction being performed using all first feature points in a first feature point set and all second feature points in a second feature point set of the to-be-modeled image frame; and a third updating unit, configured to remove the to-be-modeled image frame from the to-be-modeled image frame set, in response to the three-dimensional reconstruction being successful.

In some embodiments, the reconstruction module further includes: a to-be-modeled image frame retaining unit, configured to determine that an image frame adjacent the to-be-modeled image frame is not used for the three-dimensional reconstruction, and retaining the to-be-modeled image frame in the to-be-modeled image frame set.

In some embodiments, the reconstruction module further includes: an adjacent image frame determination unit, configured to determine that a difference in frame serial number between the to-be-modeled image frame and the image frame already used for the three-dimensional reconstruction is less than a third threshold.

According to embodiments of the present disclosure, an electronic device and a readable storage medium are provided.

As shown in FIG. 6, which is a block diagram of an electronic device of a method for processing an image according to an embodiment of the present disclosure. The electronic device is intended to represent various forms of digital computers, such as laptop computers, desktop computers, workbenches, personal digital assistants, servers, blade servers, mainframe computers, and other suitable computers. The electronic device may also represent various forms of mobile apparatuses, such as personal digital processing, cellular phones, smart phones, wearable devices, and other similar computing apparatuses. The components shown herein, their connections and relationships, and their functions are merely examples, and are not intended to limit the implementation of the present disclosure described and/or claimed herein.

Figure 8:
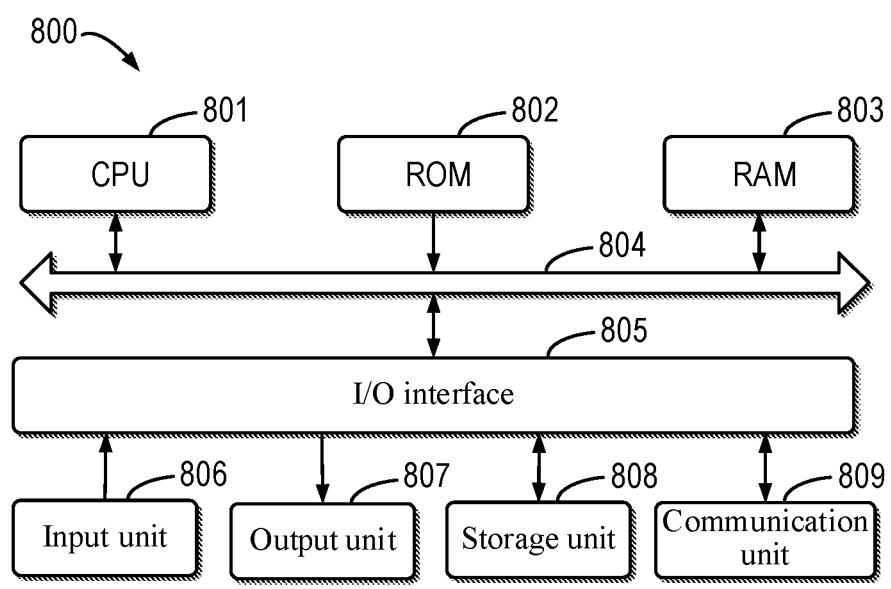
FIG. 8 is a schematic block diagram of an example electronic device that may be used to implement embodiments of the present disclosure.

As shown in FIG. 8, the electronic device includes: one or more processors 801, a memory 802, and interfaces for connecting various components, including high-speed interfaces and low-speed interfaces. The various components are connected to each other using different buses, and may be installed on a common motherboard or in other methods as needed. The processor may process instructions executed within the electronic device, including instructions stored in or on the memory to display graphic information of GUI on an external input/output apparatus (such as a display device coupled to the interface). In other embodiments, a plurality of processors and/or a plurality of buses may be used together with a plurality of memories if desired. Similarly, a plurality of electronic devices may be connected, and the devices provide some necessary operations (for example, as a server array, a set of blade servers, or a multi-processor system). In FIG. 8, one processor 801 is used as an example.

The memory 802 is a non-transitory computer readable storage medium provided by the present disclosure. The memory stores instructions executable by at least one processor, so that the at least one processor performs the method for processing an image provided by the present disclosure. The non-transitory computer readable storage medium of the present disclosure stores computer instructions for causing a computer to perform the method for processing an image provided by the present disclosure.

The memory 802, as a non-transitory computer readable storage medium, may be used to store non-transitory software programs, non-transitory computer executable programs and modules, such as program instructions/modules corresponding to the method for processing an image in embodiments of the present disclosure (for example, the matching association relationship acquisition module 710, the first feature point set determination module 720, and the reconstruction module 730 shown in FIG. 7). The processor 801 executes the non-transitory software programs, instructions, and modules stored in the memory 802 to execute various functional applications and data processing of the server, that is, to implement the method for processing an image in the foregoing method embodiment.

The memory 802 may include a storage program area and a storage data area, where the storage program area may store an operating system and at least one function required application program; and the storage data area may store data created by the use of the electronic device according to the method for processing an image, etc. In addition, the memory 802 may include a high-speed random access memory, and may also include a non-transitory memory, such as at least one magnetic disk storage device, a flash memory device, or other non-transitory solid-state storage devices. In some embodiments, the memory 802 may optionally include memories remotely provided with respect to the processor 801, and these remote memories may be connected to the electronic device of the method for processing an image through a network. Examples of the above network include but are not limited to the Internet, intranet, local area network, mobile communication network, and combinations thereof.

The electronic device of the method for processing an image may further include: an input apparatus 803 and an output apparatus 804. The processor 801, the memory 602, the input apparatus 803, and the output apparatus 804 may be connected through a bus or in other methods. In FIG. 8, connection through a bus is used as an example.

The input apparatus 803 may receive input digital or character information, and generate key signal inputs related to user settings and function control of the electronic device of the method for processing an image, such as touch screen, keypad, mouse, trackpad, touchpad, pointing stick, one or more mouse buttons, trackball, joystick and other input apparatuses. The output apparatus 804 may include a display device, an auxiliary lighting apparatus (for example, LED), a tactile feedback apparatus (for example, a vibration motor), and the like. The display device may include, but is not limited to, a liquid crystal display (LCD), a light emitting diode (LED) display, and a plasma display. In some embodiments, the display device may be a touch screen.

Various embodiments of the systems and technologies described herein may be implemented in digital electronic circuit systems, integrated circuit systems, dedicated ASICs (application specific integrated circuits), computer hardware, firmware, software, and/or combinations thereof. These various embodiments may include: being implemented in one or more computer programs that can be executed and/or interpreted on a programmable system that includes at least one programmable processor. The programmable processor may be a dedicated or general-purpose programmable processor, and may receive data and instructions from a storage system, at least one input apparatus, and at least one output apparatus, and transmit the data and instructions to the storage system, the at least one input apparatus, and the at least one output apparatus.

These computing programs (also referred to as programs, software, software applications, or codes) include machine instructions of the programmable processor and may use high-level processes and/or object-oriented programming languages, and/or assembly/machine languages to implement these computing programs. As used herein, the terms "machine readable medium" and "computer readable medium" refer to any computer program product, device, and/or apparatus (for example, magnetic disk, optical disk, memory, programmable logic apparatus (PLD)) used to provide machine instructions and/or data to the programmable processor, including machine readable medium that receives machine instructions as machine readable signals. The term "machine readable signal" refers to any signal used to provide machine instructions and/or data to the programmable processor.

In order to provide interaction with a user, the systems and technologies described herein may be implemented on a computer, the computer has: a display apparatus for displaying information to the user (for example, CRT (cathode ray tube) or LCD (liquid crystal display) monitor); and a keyboard and a pointing apparatus (for example, mouse or trackball), and the user may use the keyboard and the pointing apparatus to provide input to the computer. Other types of apparatuses may also be used to provide interaction with the user; for example, feedback provided to the user may be any form of sensory feedback (for example, visual feedback, auditory feedback, or tactile feedback); and any form (including acoustic input, voice input, or tactile input) may be used to receive input from the user.

The systems and technologies described herein may be implemented in a computing system that includes backend components (e.g., as a data server), or a computing system that includes middleware components (e.g., application server), or a computing system that includes frontend components (for example, a user computer having a graphical user interface or a web browser, through which the user may interact with the implementations of the systems and the technologies described herein), or a computing system that includes any combination of such backend components, middleware components, or frontend components. The components of the system may be interconnected by any form or medium of digital data communication (e.g., communication network). Examples of the communication network include: local area networks (LAN), wide area networks (WAN), the Internet, and blockchain networks.

The computer system may include a client and a server. The client and the server are generally far from each other and usually interact through the communication network. The relationship between the client and the server is generated by computer programs that run on the corresponding computer and have a client-server relationship with each other.

It should be understood that the various forms of processes shown above may be used to reorder, add, or delete steps. For example, the steps described in the present disclosure may be performed in parallel, sequentially, or in different orders. As long as the desired results of the technical solution disclosed in the present disclosure can be achieved, no limitation is made herein.

The above specific embodiments do not constitute limitation on the protection scope of the present disclosure. Those skilled in the art should understand that various modifications, combinations, sub-combinations and substitutions may be made according to design requirements and other factors. Any modification, equivalent replacement and improvement made within the spirit and principle of the present disclosure shall be included in the protection scope of the present disclosure.

What is claimed is:

1. A method for processing an image, comprising:
  acquiring a matching association relationship of a feature point in each to-be-modeled image frame in a to-be-modeled image frame set, a plurality of to-be-modeled image frames in the to-be-modeled image frame set belonging to at least two different to-be-modeled image sequences;
  determining a first feature point set of the each to-be-modeled image frame based on the matching association relationship, the first feature point set including a first feature point, and the first feature point matching a corresponding feature point in a to-be-modeled image frame in a different to-be-modeled image sequence;
  selecting, based on a number of the first feature point in the first feature point set in the each to-be-modeled image frame, a to-be-modeled image frame from the to-be-modeled image frame set for a three-dimensional reconstruction; and
  determining a second feature point set of the each to-be-modeled image frame based on the matching association relationship, the second feature point set including a second feature point, and the second feature point only matching a corresponding feature point in a to-be-modeled image frame in a same to-be-modeled image sequence.

2. The method according to claim 1, wherein selecting, based on the number, the to-be-modeled image frame from the to-be-modeled image frame set for the three-dimensional reconstruction comprises:
- determining that a number of a first feature point in a to-be-modeled image frame is greater than a first threshold;
- selecting the to-be-modeled image frame for performing the three-dimensional reconstruction, the three-dimensional reconstruction being performed using all first feature points in the first feature point set of the to-be-modeled image frame; and
- in response to the three-dimensional reconstruction performed using the to-be-modeled image frame being successful, removing the to-be-modeled image frame from the to-be-modeled image frame set.

3. The method according to claim 2, further comprising:
- determining that a number of a first feature point in a to-be-modeled image frame is greater than a second threshold and that an image frame adjacent to the to-be-modeled image frame is already used for the three-dimensional reconstruction, the second threshold being less than the first threshold;
- selecting the to-be-modeled image frame to perform the three-dimensional reconstruction, the three-dimensional reconstruction being performed using all first feature points in the first feature point set and a portion of second feature points in the second feature point set; and
- removing the to-be-modeled image frame from the to-be-modeled image frame set in response to the three-dimensional reconstruction being successful.

4. The method according to claim 3, further comprising:
- selecting randomly the portion of the second feature points from the second feature point set to perform the three-dimensional reconstruction, a number of the selected second feature points being less than the number of the first feature point in the first feature point set.

5. The method according to claim 3, further comprising:
- determining, in remaining to-be-modeled image frames in the to-be-modeled image frame set, that an image frame adjacent a to-be-modeled image frame is already used for the three-dimensional reconstruction;
- selecting the to-be-modeled image frame to perform the three-dimensional reconstruction, the three-dimensional reconstruction being performed using all first feature points in a first feature point set and all second feature points in a second feature point set of the to-be-modeled image frame; and
- removing the to-be-modeled image frame from the to-be-modeled image frame set, in response to the three-dimensional reconstruction being successful.

6. The method according to claim 3, further comprising:
- determining that an image frame adjacent the to-be-modeled image frame is not used for the three-dimensional reconstruction, and retaining the to-be-modeled image frame in the to-be-modeled image frame set.

7. The method according to claim 3, wherein determining that the adjacent image frame of the to-be-modeled image frame is already used for the three-dimensional reconstruction comprises:
- determining that a difference in frame serial number between the to-be-modeled image frame and the image frame already used for the three-dimensional reconstruction is less than a third threshold.

8. An electronic device, comprising:
- at least one processor; and
- a storage device, communicated with the at least one processor,
- wherein the storage device stores an instruction executable by the at least one processor, and the instruction is executed by the at least one processor, to enable the at least one processor to perform operations, the operations comprising:
- acquiring a matching association relationship of a feature point in each to-be-modeled image frame in a to-be-modeled image frame set, a plurality of to-be-modeled image frames in the to-be-modeled image frame set belonging to at least two different to-be-modeled image sequences;
- determining a first feature point set of the each to-be-modeled image frame based on the matching association relationship, the first feature point set including a first feature point, and the first feature point matching a corresponding feature point in a to-be-modeled image frame in a different to-be-modeled image sequence;
- selecting, based on a number of the first feature point in the first feature point set in the each to-be-modeled image frame, a to-be-modeled image frame from the to-be-modeled image frame set for a three-dimensional reconstruction; and
- determining a second feature point set of the each to-be-modeled image frame based on the matching association relationship, the second feature point set including a second feature point, and the second feature point only matching a corresponding feature point in a to-be-modeled image frame in a same to-be-modeled image sequence.

9. The electronic device according to claim 8, wherein selecting, based on the number, the to-be-modeled image frame from the to-be-modeled image frame set for the three-dimensional reconstruction comprises:
- determining that a number of a first feature point in a to-be-modeled image frame is greater than a first threshold;
- selecting the to-be-modeled image frame for performing the three-dimensional reconstruction, the three-dimensional reconstruction being performed using all first feature points in the first feature point set of the to-be-modeled image frame; and
- in response to the three-dimensional reconstruction performed using the to-be-modeled image frame being successful, removing the to-be-modeled image frame from the to-be-modeled image frame set.

10. The electronic device according to claim 9, wherein the operations further comprise:
- determining that a number of a first feature point in a to-be-modeled image frame is greater than a second threshold and that an image frame adjacent to the to-be-modeled image frame is already used for the three-dimensional reconstruction, the second threshold being less than the first threshold;
- selecting the to-be-modeled image frame to perform the three-dimensional reconstruction, the three-dimensional reconstruction being performed using all first feature points in the first feature point set and a portion of second feature points in the second feature point set; and
- removing the to-be-modeled image frame from the to-be-modeled image frame set in response to the three-dimensional reconstruction being successful.

11. The electronic device according to claim 10, wherein the operations further comprise:
  selecting randomly the portion of the second feature points from the second feature point set to perform the three-dimensional reconstruction, a number of the selected second feature points being less than the number of the first feature point in the first feature point set.

12. The electronic device according to claim 10, wherein the operations further comprise:
  determining, in remaining to-be-modeled image frames in the to-be-modeled image frame set, that an image frame adjacent a to-be-modeled image frame is already used for the three-dimensional reconstruction;
  selecting the to-be-modeled image frame to perform the three-dimensional reconstruction, the three-dimensional reconstruction being performed using all first feature points in a first feature point set and all second feature points in a second feature point set of the to-be-modeled image frame; and
  removing the to-be-modeled image frame from the to-be-modeled image frame set, in response to the three-dimensional reconstruction being successful.

13. The electronic device according to claim 10, wherein the operations further comprise:
  determining that an image frame adjacent the to-be-modeled image frame is not used for the three-dimensional reconstruction, and retaining the to-be-modeled image frame in the to-be-modeled image frame set.

14. The electronic device according to claim 10, wherein determining that the adjacent image frame of the to-be-modeled image frame is already used for the three-dimensional reconstruction comprises:
  determining that a difference in frame serial number between the to-be-modeled image frame and the image frame already used for the three-dimensional reconstruction is less than a third threshold.

15. A non-transitory computer readable storage medium, storing a computer instruction thereon, wherein the computer instruction is used to cause a computer to perform operations, the operations comprise:
  acquiring a matching association relationship of a feature point in each to-be-modeled image frame in a to-be-modeled image frame set, a plurality of to-be-modeled image frames in the to-be-modeled image frame set belonging to at least two different to-be-modeled image sequences;
  determining a first feature point set of the each to-be-modeled image frame based on the matching association relationship, the first feature point set including a first feature point, and the first feature point matching a corresponding feature point in a to-be-modeled image frame in a different to-be-modeled image sequence;
  selecting, based on a number of the first feature point in the first feature point set in the each to-be-modeled image frame, a to-be-modeled image frame from the to-be-modeled image frame set for a three-dimensional reconstruction; and
  determining a second feature point set of the each to-be-modeled image frame based on the matching association relationship, the second feature point set including a second feature point, and the second feature point only matching a corresponding feature point in a to-be-modeled image frame in a same to-be-modeled image sequence.

16. The medium according to claim 15, wherein selecting, based on the number, the to-be-modeled image frame from the to-be-modeled image frame set for the three-dimensional reconstruction comprises:
  determining that a number of a first feature point in a to-be-modeled image frame is greater than a first threshold;
  selecting the to-be-modeled image frame for performing the three-dimensional reconstruction, the three-dimensional reconstruction being performed using all first feature points in the first feature point set of the to-be-modeled image frame; and
  in response to the three-dimensional reconstruction performed using the to-be-modeled image frame being successful, removing the to-be-modeled image frame from the to-be-modeled image frame set.

17. The medium according to claim 16, wherein the operations further comprise:
  determining that a number of a first feature point in a to-be-modeled image frame is greater than a second threshold and that an image frame adjacent to the to-be-modeled image frame is already used for the three-dimensional reconstruction, the second threshold being less than the first threshold;
  selecting the to-be-modeled image frame to perform the three-dimensional reconstruction, the three-dimensional reconstruction being performed using all first feature points in the first feature point set and a portion of second feature points in the second feature point set; and
  removing the to-be-modeled image frame from the to-be-modeled image frame set in response to the three-dimensional reconstruction being successful.

* * * * *